United States Patent Office 2,879,820
Patented Mar. 31, 1959

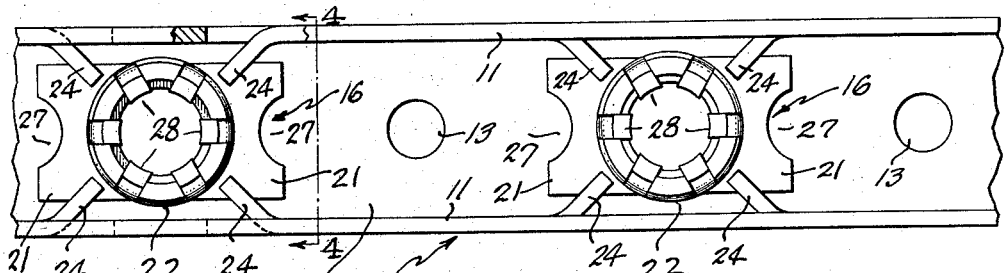
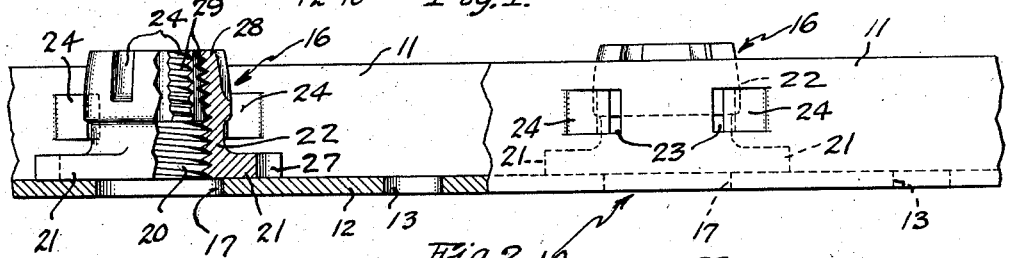
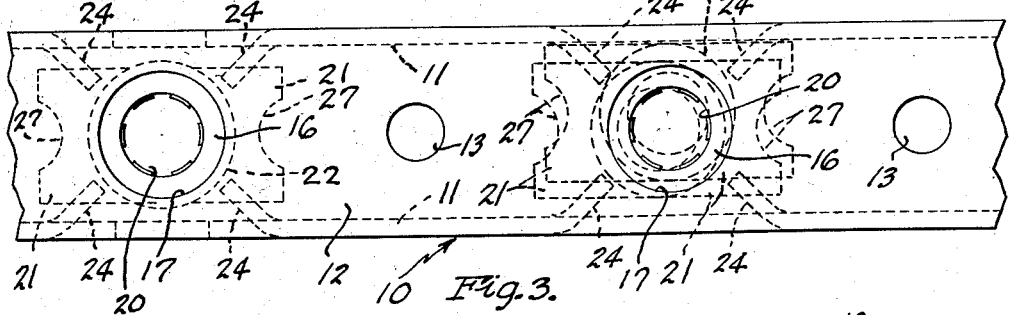
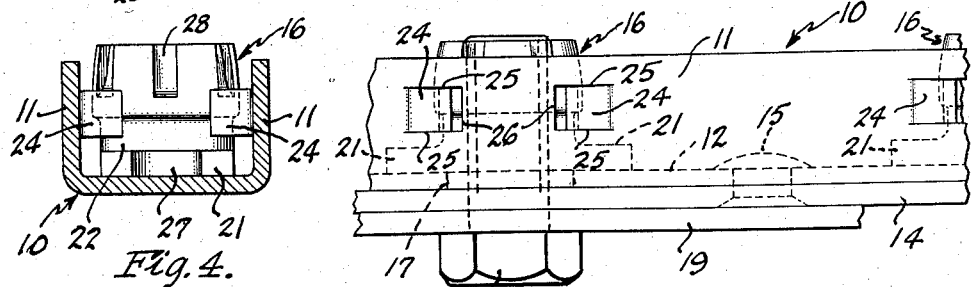

2,879,820

NARROW GANG CHANNEL SUPPORT AND POSITIONING MEANS FOR SECURING NUTS

Joseph T. Trzcinski, Stamford, Conn., assignor to Boots Aircraft Nut Corporation, Norwalk, Conn., a corporation of Delaware Application May 31, 1955, Serial No. 512,231

1 Claim. (Cl. 151—41.71)

This invention relates to a narrow gang channel of the type in which a channel bar is used as a support and positioning means for a plurality of securing nuts for use with threaded bolts or screws for attaching various members to a supporting structure, particularly in aircraft and similar structures, and has for an object to provide a channel of this type which will be of light weight and still be within the current AN specifications (Air Force—Navy Aeronautical Specifications).

It is another object of the invention to provide an improved means for securing the nuts in the channel, which will effectively retain the nuts in proper positions in the channel and at the same time will permit equal floating movement of the nut in all directions about the aligned opening in the base of the channel, to permit taking full advantage of the size of the enlarged hole in the channel, but will prevent the nut floating beyond the hole where the bolt would not be able to pick it up for threading into the nut.

Another object is to provide an improved construction which will provide greater stiffness for the channel, and will give greater room and clearance for the bucking bar in the operation of peening over the heads of securing rivets, and will also permit closer spacing of the nuts without restricting the space for the heads of the rivets.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a top plan view of a portion of this channel on an enlarged scale;

Fig. 2 is a partial longitudinal section and partial side view thereof;

Fig. 3 is a bottom view;

Fig. 4 is a transverse section substantially on line 4—4 of Fig. 1, and

Fig. 5 is a side view of a portion of this channel showing how it may be used for securing another member to a supporting structure.

The device as illustrated comprises a channel bar 10 of rolled or extruded metal, preferably of light weight metal such, for example, as various aluminum alloys when used in aircraft construction where reduced weight is important. It is of substantially U-shape in cross section, comprising laterally spaced parallel side flanges or rails 11 and a transverse connecting bottom wall 12, the side flanges or rails being preferably at right angles to the connecting wall 12. The channel is provided in the bottom wall 12 with a series of longitudinally spaced holes 13 for rivets or other securing means for mounting and securing the channel to the supporting structure with which it is to be used, such, for example, as a plate or other member 14, as shown in Fig. 5, a securing rivet being indicated in dotted lines at 15. Mounted within this channel member on the top of the bottom wall 12 and between the side flanges or rails 11 are a plurality of securing nuts 16, preferably self-locking nuts. These nuts are mounted over aligned openings 17 in the bottom wall 12 for entrance of securing bolts or screws 18, as shown in Fig. 5, for securing another member, such, for example, as a plate 19 to the opposite side of the member 14. It will be seen from Fig. 5 that as the channel structure including the nuts is secured to one side of the supporting member 14, the device may be used for mounting members on this support when access is available to the structure 14 only from the side to which the article, such as 19, is to be secured or mounted.

It is desirable to allow for variations in the locations of the securing screws or bolts, and the nuts in the channel structure for cooperating therewith, to form the holes or openings 17 of larger diameter than the screw or bolts so as to permit lateral adjustment or location of the bolt or screw in this opening 17, and this opening is also therefore of larger diameter than the threaded opening 20 in the nut. To allow for these variations in the location of the securing bolt the nuts 16 are mounted in the channel 10 for lateral floating movement, and, to take full advantage of this movement, it is desirable that the nut is capable of this lateral floating movement in all directions about the opening 17, and that the amount of this movement should be such as to permit location of the securing screw close to any side edge of the opening, but should not be sufficient to permit the nut to float beyond the opening 17 where the bolt or screw cannot pick it up when inserted from the opposite side of the channel base 12.

Improved and simplified means is provided in this construction for securing this action and advantages. The type of nut 16 used in this channel member is a so-called plate nut comprising a base flange 21 and a laterally extending cylindrical barrel 22 which is a tubular member internally threaded, as indicated at 20, to receive the screw-threaded shank of the attaching screw or bolt 18, as indicated in Fig. 5, to complete the securing or mounting operation of the part to be mounted on the support, such, for example, as that indicated at 19. The base or flange 21, as shown in Fig. 1, is of less width than the distance between the side flanges of rails 11 and preferably sufficiently less than the distance between these rails to permit lateral movement of the nut sufficient to carry the lower edge of the opening 20 in the nut to the edge of the hole 17 in both directions, and to secure the full advantage of this lateral movement the width of this flange is also substantially the diameter of the barrel 22. To secure the nut in the channel member 10 and permit these lateral floating movements, as well as similar floating movements longitudinally of the channel, these side flanges or rails 11 are lanced, as indicated at 23, forming lugs or tabs 24 which are bent inwardly so that they overhang the base or flange 21, there being four of these tabs positioned to provide a pair on each of the opposite sides of the barrel 22 of the nut; or in other words, there is a pair extending inwardly in opposite directions from each rail 11 located on opposite sides longitudinally of the barrel of the nut and overhanging the base flange 21. These lugs or tabs may be of different shapes and located in different ways, but they are preferably substantially rectangular and formed as shown, by lancing or cutting the walls of the rails 11 on three sides comprising vertically spaced horizontal cuts 25 and a connecting vertical cut 26, and then bending the metal between these cuts inwardly to form the lugs or tabs 24, and they are preferably inclined at an angle of about forty-five degrees to the rails 11. They are also of a length so that they overlap the base or flange 21 in all positions of the nut 16, and their free ends also are so located with respect to the sides of the cylindrical barrel 22 as to limit longitudinal shifting or floating movements of the nut within the channel member. It is also preferred to recess the ends of the base flange 21, as indicated at 27, to provide clearance for the heads of the rivets to permit closer spacing of the nuts and the rivets, and also to provide greater clearance for the bucking bar used to set the rivets in attaching the channel construction to the supporting or mounting structure to which it is to be attached. It will be understood that this channel member 10 may be made of any length desired or required and to carry the required number of securing nuts 16, and that the spacing of the rivet holes 13 and the spacing of these nuts longitudinally of the channel member may be anything found desirable or required.

The securing nuts 16 may be of various types but they are preferably self-locking nuts so as to prevent relative turning or loosening up of the securing screws or bolts 18 in the use of the device, particularly under jar or vibration such as is encountered, for example, in aircraft or similar constructions. In the nut shown, this locking effect is secured by cutting and forcing inwardly throughout the periphery of the free end portion of the barrel a series of tongues or lugs 28, which are threaded on their inner surfaces 29 either the full depth corresponding to threads 20 or of less or substantially half depth. As these threaded lugs are tapered inwardly from the cylindrical portion of the barrel 22 they form a threaded portion of tapered internal diameter decreasing in diameter toward the free end of the barrel and also provide broken threads 29 to thus grip and hold the threads of the securing screw or nut, it being understood that as the shank of the screw is threaded into the nut it will force these lugs 28 outwardly to substantially the diameter of the cylindrical portion of the barrel against the resilient or spring action of the metal, thus increasing the pressure and grip of these threads on the threads of the screw, and this, together with the sharp edges of the broken threads on these lugs, has a locking action on the screw.

Under the AN specifications the device is limited as to the size of the holes 17 in the base of the channel member with respect to the overall permissible width of the channel, but it is desirable that the nut be so mounted as to float about this bolt hole 17 sufficiently in all directions so that full advantage can be taken of the size of the hole in any direction. It is also important that the nut cannot float beyond the hole 17 where the bolt cannot pick it up when inserted through this hole. The lugs or tabs 24, therefore, formed and arranged as shown, provided a very simple and effective means for holding the nut both against removal from the channel by overlying the base or flange 21, and also limit side or longitudinal movement of the nut in the channel by coaction of the free ends of the lugs and the outer side walls of the cylindrical barrel 22.

Another advantage of the straight, parallel side walls or rails 11 of the channel member is that their greater height which may be permitted with this construction gives greater stiffness to the channel member. Also, as there is no overhanging of these side members into the channel, the full width of the space between these side rails may be utilized. This provides ample room for the bucking bar without restriction for peening over the heads of the rivets, and the high side rails are also an aid to guiding the bucking bar to set the rivet, which speeds up installation time. This also permits saving in weight of the channel structure within the limits of the required specification, which is important in aircraft construction. It will be seen that the nut is secured or retained by the simple tabs 24, only, which, in addition to retaining the nut in the channel member also permits as well as controls the float of the nut in all directions with respect to the hole 17. For example, the AN specifications require a 1/32" float in all directions from the hole center, and this structure and arrangement readily meets this specification and still permits keeping of the structure within the overall width specification of .406 inch. The cut-out portions 27 in the opposite ends of the flange 21 permit closer spacing for the nuts in the channel member without restricting the space for the heads of the rivets, and still secure the maximum float of the nut. These cut-outs also provide greater clearance space for the bucking bar used in peening over the head of the rivet.

Having thus set forth the nature of my invention, I claim:

A gang channel of the character described comprising an elongated U-shaped channel member including laterally spaced parallel side flanges free of overhanging edges and a connecting base portion between them, said base portion provided with a bolt hole, a securing nut mounted in the channel member over the bolt hole and comprising a base flange and a laterally extending tubular barrel between the side flanges, said base flange and barrel being of less width than the distance between the side flanges to permit lateral movement of the nut, and the walls of the side flanges being lanced to form a plurality of retaining lugs free at one end and secured to said side walls at the other, the free portions of the lugs being bent inwardly to lie over and spaced above the base flange of the nut, said free portions being substantially straight and extending substantially radially inwardly toward the nut barrel with their free ends spaced from the sides of the barrel and from the corresponding lug on the opposite side flange a distance as less than the diameter of the nut barrel to retain the nut in the channel member while permitting limited lateral floating movement of the nut in all directions relative to the bolt hole, said lugs forming the sole means of retaining and positioning the nut in the channel member.

References Cited in the file of this patent
UNITED STATES PATENTS

| | | |
|---|---|---|
| 2,249,923 | Whitcombe | July 22, 1941 |
| 2,381,233 | Summers | Aug. 7, 1945 |
| 2,429,833 | Luce | Oct. 28, 1947 |
| 2,705,991 | Reiner | Apr. 12, 1955 |

FOREIGN PATENTS

| | | |
|---|---|---|
| 555,783 | Great Britain | Sept. 7, 1943 |